United States Patent
O'Donnell et al.

(10) Patent No.: US 9,810,451 B2
(45) Date of Patent: *Nov. 7, 2017

(54) OILFIELD APPLICATION OF SOLAR ENERGY COLLECTION

(71) Applicant: GLASSPOINT SOLAR, INC., Fremont, CA (US)

(72) Inventors: John Setel O'Donnell, Palo Alto, CA (US); Peter Emery von Behrens, San Francisco, CA (US); Stuart M. Heisler, Bakersfield, CA (US); David Bruce Jackson, Bakersfield, CA (US)

(73) Assignee: Glasspoint Solar, Inc., Fremont, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 14/194,919

(22) Filed: Mar. 3, 2014

(65) Prior Publication Data

US 2014/0345599 A1    Nov. 27, 2014

Related U.S. Application Data

(63) Continuation of application No. 13/576,623, filed as application No. PCT/US2011/042907 on Jul. 3, 2011, now Pat. No. 8,701,773.

(Continued)

(51) Int. Cl.
*F24J 2/42* (2006.01)
*E21B 43/24* (2006.01)
(Continued)

(52) U.S. Cl.
CPC ............... *F24J 2/42* (2013.01); *E21B 43/24* (2013.01); *F01K 13/02* (2013.01); *F01K 17/04* (2013.01);
(Continued)

(58) Field of Classification Search
CPC .......... F24J 2/42; F24J 2/07; F24J 2/14; F24J 2/541; F24J 2/24; F24J 2002/1023;
(Continued)

(56) References Cited

U.S. PATENT DOCUMENTS 1,240,890 A  9/1917  Shuman et al.
2,217,593 A  10/1940  London
(Continued)

FOREIGN PATENT DOCUMENTS

CN    2050918 U    1/1990
CN    2776908 Y    5/2006
(Continued)

OTHER PUBLICATIONS

Adventures in Energy, "Extracting Oil and Natural Gas." 1 pages, accessed Oct. 7, 2013.

(Continued)

*Primary Examiner* — Wei Wang
(74) *Attorney, Agent, or Firm* — Perkins Coie LLP

(57) ABSTRACT

Solar energy is collected and used for various industrial processes, such as oilfield applications, e.g. generating steam that is injected downhole, enabling enhanced oil recovery. Solar energy is indirectly collected using a heat transfer fluid in a solar collector, delivering heat to a heat exchanger that in turn delivers heat into oilfield feedwater, producing hotter water or steam. Solar energy is directly collected by directly generating steam with solar collectors, and then injecting the steam downhole. Solar energy is collected to preheat water that is then fed into fuel-fired steam generators that in turn produce steam for downhole injection. Solar energy is collected to produce electricity via a Rankine cycle turbine generator, and rejected heat warms feedwater for fuel-fired steam generators. Solar energy is (Continued)

collected (directly or indirectly) to deliver heat to a heater-treater, with optional fuel-fired additional heat generation.

25 Claims, 4 Drawing Sheets

Related U.S. Application Data

(60) Provisional application No. 61/361,507, filed on Jul. 5, 2010.

(51) Int. Cl.
| | |
|---|---|
| F01K 13/02 | (2006.01) |
| F01K 17/04 | (2006.01) |
| F22B 1/00 | (2006.01) |
| F22B 33/18 | (2006.01) |
| F24J 2/07 | (2006.01) |
| F24J 2/14 | (2006.01) |
| F24J 2/24 | (2006.01) |
| F24J 2/54 | (2006.01) |
| F24J 2/10 | (2006.01) |

(52) U.S. Cl.
CPC .............. *F22B 1/006* (2013.01); *F22B 33/18* (2013.01); *F24J 2/07* (2013.01); *F24J 2/14* (2013.01); *F24J 2/541* (2013.01); *F24J 2/24* (2013.01); *F24J 2002/1023* (2013.01); *Y02E 10/41* (2013.01); *Y02E 10/45* (2013.01); *Y02E 10/47* (2013.01); *Y02E 20/14* (2013.01); *Y02P 80/24* (2015.11)

(58) Field of Classification Search
CPC .......... E21B 43/24; F01K 13/02; F01K 17/04; F22B 1/006; F22B 33/18; Y02P 80/24; Y02E 10/41; Y02E 10/45; Y02E 10/47; Y02E 20/14
See application file for complete search history.

(56) References Cited

U.S. PATENT DOCUMENTS

| | | |
|---|---|---|
| 2,221,919 A | 11/1940 | Kenan |
| 2,859,745 A | 11/1958 | Von Brudersdorff |
| 3,672,572 A | 6/1972 | Delfs |
| 3,847,136 A | 11/1974 | Salvail |
| 3,923,039 A | 12/1975 | Falbel |
| 3,962,873 A | 6/1976 | Davis |
| 3,991,740 A | 11/1976 | Rabl |
| 3,994,279 A | 11/1976 | Barak |
| 3,996,917 A | 12/1976 | Trihey |
| 4,003,366 A | 1/1977 | Lightfoot |
| 4,015,585 A | 4/1977 | Fattor |
| 4,078,549 A | 3/1978 | McKeen et al. |
| 4,083,155 A | 4/1978 | Lampert |
| 4,088,116 A | 5/1978 | Pastor |
| 4,095,369 A | 6/1978 | Posnansky et al. |
| 4,108,154 A | 8/1978 | Nelson |
| 4,122,832 A | 10/1978 | Hirschsohn et al. |
| 4,124,277 A | 11/1978 | Stang |
| 4,149,523 A | 4/1979 | Boy-Marcotte et al. |
| 4,159,712 A | 7/1979 | Legg |
| 4,174,752 A | 11/1979 | Slater et al. |
| 4,184,482 A | 1/1980 | Cohen |
| 4,202,322 A | 5/1980 | Delgado et al. |
| 4,209,222 A | 6/1980 | Posnansky |
| 4,219,008 A | 8/1980 | Schultz |
| RE30,407 E | 9/1980 | Lightfoot |
| 4,230,095 A | 10/1980 | Winston |
| 4,237,864 A | 12/1980 | Kravitz |
| 4,249,340 A | 2/1981 | Maes, Jr. |
| 4,258,696 A | 3/1981 | Gopal |
| 4,263,893 A | 4/1981 | Pavlak et al. |
| 4,280,480 A | 7/1981 | Raposo |
| 4,282,394 A | 8/1981 | Lackey et al. |
| 4,287,880 A | 9/1981 | Geppert |
| 4,290,419 A | 9/1981 | Rabedeaux |
| 4,314,604 A | 2/1982 | Koller |
| 4,318,394 A | 3/1982 | Alexander |
| 4,333,447 A | 6/1982 | Lemrow et al. |
| 4,343,533 A | 8/1982 | Currin et al. |
| 4,371,623 A | 2/1983 | Taylor |
| 4,372,386 A | 2/1983 | Rhoades et al. |
| 4,386,600 A | 6/1983 | Eggert, Jr. |
| 4,410,156 A | 10/1983 | Pischzik et al. |
| 4,423,719 A | 1/1984 | Hutchison |
| 4,445,499 A | 5/1984 | Platell |
| 4,462,390 A | 7/1984 | Holdridge et al. |
| 4,484,568 A | 11/1984 | Witt |
| 4,490,926 A | 1/1985 | Stokes et al. |
| 4,513,733 A | 4/1985 | Braun |
| 4,597,377 A | 7/1986 | Melamed |
| 4,628,142 A | 12/1986 | Hashizume |
| 4,727,854 A | 3/1988 | Johnson |
| 4,741,161 A | 5/1988 | Belart et al. |
| 5,048,507 A | 9/1991 | Ridett |
| 5,058,675 A * | 10/1991 | Travis ............... E21B 36/00 126/602 |
| 5,103,524 A | 4/1992 | Vowles |
| 5,191,876 A | 3/1993 | Atchley |
| 5,258,101 A | 11/1993 | Breu |
| 5,344,496 A | 9/1994 | Stern et al. |
| 5,347,402 A | 9/1994 | Arbogast |
| 5,520,747 A | 5/1996 | Marks |
| 5,524,610 A | 6/1996 | Clark |
| 5,699,785 A | 12/1997 | Sparkman |
| 5,851,309 A | 12/1998 | Kousa |
| 5,954,046 A | 9/1999 | Wegler |
| 6,017,002 A | 1/2000 | Burke et al. |
| 6,129,844 A | 10/2000 | Dobelmann |
| 6,220,339 B1 | 4/2001 | Krecke |
| 6,233,914 B1 | 5/2001 | Fisher |
| 6,237,337 B1 | 5/2001 | Bronicki et al. |
| 6,279,312 B1 | 8/2001 | Hennecke |
| 6,294,723 B2 | 9/2001 | Uematsu et al. |
| 6,363,928 B1 | 4/2002 | Anderson, Jr. |
| 6,485,152 B2 | 11/2002 | Wood |
| 6,508,850 B1 | 1/2003 | Kotliar |
| 7,028,685 B1 | 4/2006 | Krecke |
| 7,055,519 B2 | 6/2006 | Litwin |
| 7,337,843 B2 | 3/2008 | Mecham et al. |
| 7,748,137 B2 | 7/2010 | Wang |
| 7,858,875 B2 | 12/2010 | Lu |
| 7,975,686 B2 | 7/2011 | Prueitt |
| 7,992,553 B2 | 8/2011 | Le Lievre |
| 8,056,555 B2 | 11/2011 | Prueitt |
| 8,333,186 B2 | 12/2012 | Jennings |
| 8,342,169 B2 | 1/2013 | Glynn |
| 8,397,434 B2 | 3/2013 | Bayne |
| 8,430,090 B2 | 4/2013 | Angel et al. |
| 8,604,333 B2 | 12/2013 | Angel et al. |
| 8,701,773 B2 | 4/2014 | O'Donnell et al. |
| 8,739,774 B2 | 6/2014 | O'Donnell et al. |
| 8,748,731 B2 | 6/2014 | MacGregor et al. |
| 8,752,542 B2 | 6/2014 | O'Donnell et al. |
| 8,887,712 B2 | 11/2014 | von Behrens |
| 8,915,244 B2 | 12/2014 | von Behrens |
| 2001/0008144 A1 | 7/2001 | Uematsu et al. |
| 2002/0108745 A1 | 8/2002 | Kimura et al. |
| 2003/0188477 A1 | 10/2003 | Pasternak et al. |
| 2004/0004303 A1 | 1/2004 | Iskra |
| 2004/0055594 A1 | 3/2004 | Hochberg et al. |
| 2006/0048770 A1 | 3/2006 | Meksvanh et al. |
| 2007/0056726 A1 | 3/2007 | Shurtleff |
| 2008/0066736 A1 | 3/2008 | Zhu |
| 2008/0083405 A1 | 4/2008 | Kimura et al. |
| 2008/0127647 A1* | 6/2008 | Leitner ............... F02C 1/007 60/645 |
| 2008/0163864 A1 | 7/2008 | Larson |
| 2008/0216822 A1 | 9/2008 | Lazzara et al. |
| 2008/0236227 A1 | 10/2008 | Flynn |

(56) References Cited

U.S. PATENT DOCUMENTS

| | | |
|---|---|---|
| 2008/0257552 A1* | 10/2008 | Shurtleff ............... E21B 43/24 166/272.6 |
| 2008/0308094 A1 | 12/2008 | Johnston |
| 2009/0056698 A1 | 3/2009 | Johnson et al. |
| 2009/0056699 A1 | 3/2009 | Mills et al. |
| 2009/0056704 A1 | 3/2009 | Donati et al. |
| 2009/0056944 A1 | 3/2009 | Nitschke |
| 2009/0199847 A1 | 8/2009 | Hawley |
| 2009/0260359 A1 | 10/2009 | Palkes |
| 2009/0277224 A1 | 11/2009 | Angel et al. |
| 2009/0277440 A1 | 11/2009 | Angel et al. |
| 2009/0320830 A1 | 12/2009 | Bennett |
| 2010/0000733 A1 | 1/2010 | Chiesa et al. |
| 2010/0000773 A1 | 1/2010 | Yoshinaga et al. |
| 2010/0051016 A1 | 3/2010 | Ammar |
| 2010/0051021 A1 | 3/2010 | Kunz |
| 2010/0175687 A1 | 7/2010 | Zillmer et al. |
| 2010/0300431 A1 | 12/2010 | Carrascosa Perez et al. |
| 2011/0017274 A1 | 1/2011 | Huang et al. |
| 2011/0036090 A1* | 2/2011 | Rop ..................... F01K 3/242 60/641.8 |
| 2011/0088686 A1 | 4/2011 | Hochberg et al. |
| 2011/0094755 A1 | 4/2011 | Corbett et al. |
| 2011/0126824 A1 | 6/2011 | Conlon et al. |
| 2011/0174935 A1 | 7/2011 | Bingham et al. |
| 2011/0203574 A1 | 8/2011 | Harding |
| 2011/0203577 A1 | 8/2011 | Coduri |
| 2011/0240006 A1 | 10/2011 | Linke et al. |
| 2011/0277470 A1 | 11/2011 | Benyaminy et al. |
| 2011/0291405 A1 | 12/2011 | Burger et al. |
| 2012/0067337 A1 | 3/2012 | Hall et al. |
| 2012/0125400 A1 | 5/2012 | Angel et al. |
| 2012/0125611 A1 | 5/2012 | Ayirala et al. |
| 2012/0138293 A1 | 6/2012 | Kaminsky et al. |
| 2012/0138316 A1 | 6/2012 | Matzakos |
| 2012/0152307 A1 | 6/2012 | MacGregor et al. |
| 2012/0167873 A1 | 7/2012 | Venetos et al. |
| 2012/0234311 A1 | 9/2012 | Johnson et al. |
| 2012/0255309 A1 | 10/2012 | Venetos et al. |
| 2012/0273195 A1 | 11/2012 | Wheeler et al. |
| 2012/0274069 A1 | 11/2012 | Venetos et al. |
| 2013/0091842 A1 | 4/2013 | Kaufmann et al. |
| 2013/0092153 A1 | 4/2013 | O'Donnell et al. |
| 2013/0206134 A1 | 8/2013 | O'Donnell et al. |
| 2013/0220305 A1 | 8/2013 | von Behrens |
| 2014/0069416 A1 | 3/2014 | von Behrens |
| 2014/0190469 A1 | 7/2014 | O'Donnell et al. |
| 2014/0216717 A1 | 8/2014 | O'Donnell et al. |
| 2014/0318792 A1 | 10/2014 | Chen et al. |
| 2014/0326234 A1 | 11/2014 | O'Donnell et al. |
| 2014/0347757 A1 | 11/2014 | MacGregor et al. |
| 2015/0144125 A1 | 5/2015 | von Behrens |
| 2015/0295158 A1 | 10/2015 | O'Donnell et al. |

FOREIGN PATENT DOCUMENTS

| | | |
|---|---|---|
| CN | 2926930 Y | 7/2007 |
| CN | 200958464 Y | 10/2007 |
| CN | 101126553 A | 2/2008 |
| CN | 201059795 Y | 5/2008 |
| CN | 101270675 | 9/2008 |
| CN | 101280966 | 10/2008 |
| CN | 101354191 A | 1/2009 |
| CN | 101363958 A | 2/2009 |
| CN | 201359397 Y | 12/2009 |
| CN | 202598911 | 12/2012 |
| DE | 102004013590 | 10/2005 |
| DE | 202005021000 U1 | 1/2007 |
| EP | 0506568 A1 | 9/1992 |
| EP | 0946432 B1 | 1/2001 |
| EP | 988493 B1 | 8/2003 |
| ES | 2327991 A1 | 11/2009 |
| FR | 2696753 A1 | 4/1994 |
| JP | 56085508 | 7/1981 |
| JP | 2001082104 | 3/2001 |
| KR | 20080024309 A | 3/2008 |
| WO | WO-0181240 A2 | 11/2001 |
| WO | WO-2007146183 A2 | 12/2007 |
| WO | 2009002772 A2 | 12/2008 |
| WO | WO-2008153922 | 12/2008 |
| WO | WO-2009012378 A1 | 1/2009 |
| WO | WO-2009126875 A2 | 10/2009 |
| WO | WO-2009131438 A2 | 10/2009 |
| WO | WO-2010032095 A2 | 3/2010 |
| WO | 2010043744 A2 | 4/2010 |
| WO | WO2010040957 | 4/2010 |
| WO | WO-2010088632 A2 | 8/2010 |
| WO | WO-2011053863 A2 | 5/2011 |
| WO | 2012006258 A2 | 1/2012 |
| WO | WO-2012006255 A2 | 1/2012 |
| WO | WO-2012006257 A2 | 1/2012 |
| WO | WO-2012128877 A2 | 9/2012 |
| WO | WO-2014107688 A1 | 7/2014 |

OTHER PUBLICATIONS

Adventures in Energy, "Separating Oil, Natural Gas and Water." 1 page, accessed Oct. 7, 2013.
Bierman et al "Performance of Enclosed Trough OTSG for Enhanced Oil Recovery," SolarPaces 2013, pp. 11.
Bierman et al "Solar Enhanced Oil Recovery Plant in South Oman," SolarPaces 2013; pp. 10.
BrightSource Limitless, "Coalinga Project Facts, A BrightSource Energy Concentrating Solar Power Project," Fact Sheet, accessed Sep. 19, 2013, http://www.brightsourceenergy.com/stuff/contentmgr/files/0/ad5d33a2bc493a5079b5dda609724238/folder/coalinga_fact_sheet.pdf, 2 pages.
BrightSource Limitless, "Enhanced Oil Recovery Project—Coalinga," accessed Sep. 19, 2013, http://www.brightsourceenergy.com/coalinga, 2 pages.
Champion Technologies, "Enhanced Oil Recovery." 2 pages, accessed Oct. 7, 2013.
International Search Report and Written Opinion issued in PCT/US2011/042907 Feb. 24, 2012 entire document, Korean Intellectual Property Office, Seo-gu, Republic of Korea.
PROZ, 'On the edge of manufacturing tolerance'[bulletin board], Mar. 12, 2005 [retrieved on Jan. 7, 2014]. Retrieved from the internet <http://www.proz.com/kudoz/English/military_defense/968330-on_the_edge_of_manufacturing_tolerance.html>.
The Linde Group, "Enhanced Oil Recovery (EOR)", 1 page, accessed Oct. 7, 2013.
Wilson, Bob. "Re: Why does a bridge have rollers under it? How do the rollers of a bridge work?", Newton Ask a Scientist! (DOE Office of Science) [online], Jan. 2, 2008 [retrieved from the internet <URL:http://web.archive.org/web/20080102111713/http://www.newton.dep.anl.gov/askasci/eng99/eng99556.htm>.
International Preliminary Report on Patentability issued in PCT/US11/42907, Jan. 8, 2013, entire document, International Bureau of WIPO, Geneva, Switzerland.
European Search Report for European Patent Application No. 11804239.9, Applicant: Glasspoint Solar, Inc., dated Apr. 20, 2017, 13 pages.
Weatherford, "The SteamSaver Injection System," www.weatherford.com, 2004-2008, 2 pages.

* cited by examiner

OILFIELD APPLICATION OF SOLAR ENERGY COLLECTION

This non-provisional application is a continuation of U.S. patent application Ser. No. 13/576,623, filed Aug. 1, 2012 which is a U.S. National Phase of PCT/2011/042907, filed on Jul. 3, 2011, which claimed priority to U.S. Provisional Application No. 61/361,507, filed Jul. 5, 2010. Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

- U.S. Provisional Application Ser. No. 61/149,292, filed Feb. 2, 2009, first named inventor Rod MacGregor, and entitled Concentrating Solar Power with Glasshouses;
- U.S. Provisional Application Ser. No. 61/176,041, filed May 6, 2009, first named inventor Peter Von Behrens, and entitled Concentrating PhotoVoltaics with Glasshouses:
- PCT Application Ser. No. PCT/US10/22780, filed Feb. 1, 2010, first named inventor Roderick MacGregor, and entitled Concentrating Solar Power with Glasshouses;
- U.S. Provisional Application Ser. No. 61/361,509, filed Jul. 5, 2010, first named inventor Peter Von Behrens, and entitled Concentrating Solar Power with Glasshouses;
- U.S. Provisional Application Ser. No. 61/445,545, filed Feb. 23, 2011, first named inventor John Setel O'Donnell, and entitled Direct Solar Oilfield Steam Generation;
- U.S. Provisional Application Ser. No. 61/361,507, filed Jul. 5, 2011, first named inventor John Setel O'Donnell, and entitled Oilfield Application of Solar Energy Collection;
- PCT Application Serial No. PCT/US11/42891, filed Jul. 2, 2011, first named inventor Peter Von Behrens, and entitled Concentrating Solar Power with Glasshouses; and
- PCT Application Serial No. PCT/US11/42906, filed Jul. 3, 2011, first named inventor John Setel O'Donnell, and entitled Direct Solar Oilfield Steam Generation.

BACKGROUND

Field

Advancements in solar energy collection and use thereof are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Concentrated solar power systems use mirrors, known as concentrators, to gather solar energy over a large space and aim and focus the energy at receivers that convert incoming solar energy to another form, such as heat or electricity. There are several advantages, in some usage scenarios, to concentrated systems over simpler systems that directly use incident solar energy. One advantage is that more concentrated solar energy is more efficiently transformed to heat or electricity than less concentrated solar energy. Thermal and photovoltaic solar receivers operate more efficiently at higher incident solar energy levels. Another advantage is that non-concentrated solar energy receivers are, in some usage scenarios, more expensive than mirror systems used to concentrate sunlight. Thus, by building a system with mirrors, total cost of gathering sunlight over a given area and converting the gathered sunlight to useful energy is reduced.

Concentrated solar energy collection systems, in some contexts, are divided into four types based on whether the solar energy is concentrated into a line-focus receiver or a point-focus receiver and whether the concentrators are single monolithic reflectors or multiple reflectors arranged as a Fresnel reflector to approximate a monolithic reflector.

A line-focus receiver is a receiver with a target that is a relatively long straight line, like a pipe. A line-focus concentrator is a reflector that receives sunlight over a two dimensional space and concentrates the sunlight into a significantly smaller focal point in one dimension (width) while reflecting the sunlight without concentration in the other dimension (length) thus creating a focal line. A line-focus concentrator with a line-focus receiver at its focal line is a basic trough system. The concentrator is optionally rotated in one dimension around its focal line to track daily movement of the sun to improve total energy capture and conversion.

A point-focus receiver is a receiver target that is essentially a point, but in various approaches is a panel, window, spot, ball, or other target shape, generally more equal in width and length than a line-focus receiver. A point-focus concentrator is a reflector (made up of a single smooth reflective surface, multiple fixed facets, or multiple movable Fresnel facets) that receives sunlight over a two-dimensional space and concentrates the sunlight into a significantly smaller focal point in two dimensions (width and length). A monolithic point-focus concentrator with a point-focus receiver at its focal point is a basic dish concentrated solar system. The monolithic concentrator is optionally rotated in two dimensions to rotate its focal axis around its focal point to track daily and seasonal movement of the sun to improve total energy capture and conversion.

A parabolic trough system is a line concentrating system using a monolithic reflector shaped like a large half pipe. The reflector has a 1-dimensional curvature to focus sunlight onto a line-focus receiver or approximates such curvature through multiple facets fixed relative to each other.

A concentrating Fresnel reflector is a line concentrating system similar to the parabolic trough replacing the trough with a series of mirrors, each the length of a receiver, that are flat or alternatively slightly curved in their width. Each mirror is individually rotated about its long axis to aim incident sunlight onto the line-focus receiver.

A parabolic dish system is a point concentrating system using a monolithic reflector shaped like a bowl. The reflector has a 2-dimensional curvature to focus sunlight onto a point-focus receiver or approximates such curvature through multiple flat or alternatively curved facets fixed relative to each other.

A solar power tower is a point concentrating system similar to the parabolic dish, replacing the dish with a 2-dimensional array of mirrors that are flat or alternatively curved. Each mirror (heliostat) is individually rotated in two dimensions to aim incident sunlight onto a point-focus receiver. The individual mirrors and an associated control system comprise a point-locus concentrator whose focal axis rotates around its focal point.

In solar thermal systems, the receiver is a light to heat transducer. The receiver absorbs solar energy, transforming it to heat and transmitting the heat to a thermal transport medium such as water, steam, oil, or molten salt. The receiver converts solar energy to heat and minimizes and/or reduces heat loss due to thermal radiation.

SYNOPSIS

The invention may be implemented in numerous ways, including as a process, an article of manufacture, an apparatus, a system, and a composition of matter. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. As is discussed in more detail in the Conclusions, the invention encompasses all possible modifications and variations within the scope of the issued claims.

DETAILED DESCRIPTION

Figure 1:
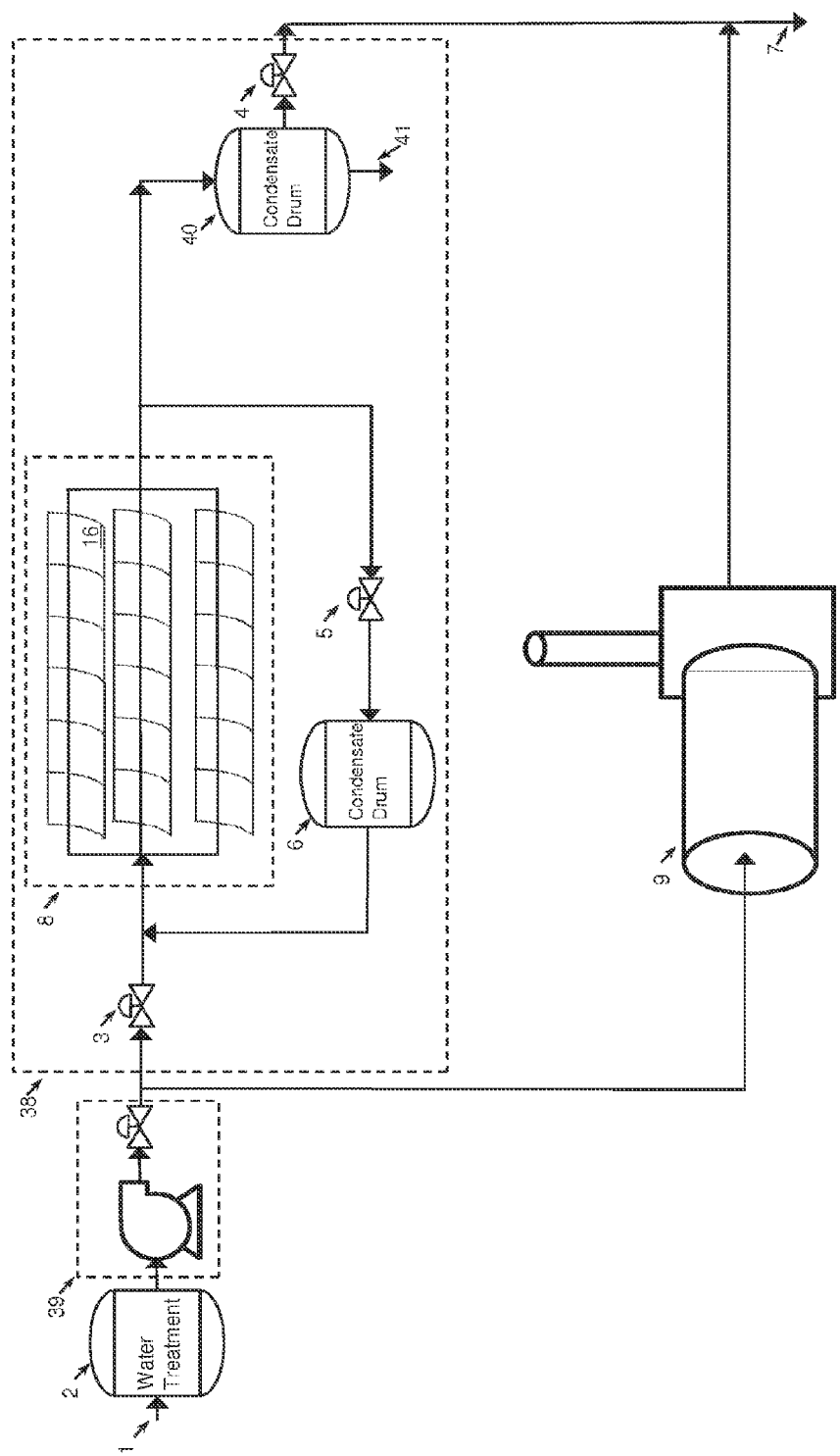
FIG. 1 illustrates various details of an embodiment of an oilfield application of solar energy collection.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Thermal techniques for enhanced oil recovery enable improvements for current and future oil production around the world. For example, steam injection provides nearly half of California's oil production, and improvements in ongoing expansion of steamflood and steam stimulation systems enable a more nearly stable energy supply.

Injected steam expands oil production through several mechanisms. By raising the temperature of oil and the surrounding formation, viscosity of the oil is reduced, thus expediting its flow. In some embodiments, steam flow and resulting condensed water flow sweep oil along towards production wells. Other characteristics, such as reservoir pressure and rock wettability, are affected by steam injection as well.

In some embodiments, steam used in oilfield operations is injected at temperatures ranging from 300 F to 700 F or 750 F. and pressures at up to 1500 or 2500 PSI, where particular temperatures and pressures are determined by specifics of the oil formation and production approach. In some embodiments, steam for oilfield injection is produced in once-through steam generators. In some embodiments, the steam generators are heated by fuel combustion. Fuel combustion carries many costs, such as the cost of fuel, the costs of complying with regulatory regimes regarding air quality and disposal of combustion products, and coming regimes that impose costs for emitting CO2. In some embodiments, solar-heated steam generators are used to produce steam for oilfield operations. Solar-heated steam generators use little or no fuel, and thus emit little or no combustion products or CO2.

In some embodiments, point-focus "power tower" steam generation based solar apparatus systems deliver steam into an oilfield via a "reboiler," a heat exchanger that condenses high-purity, high-pressure steam that is generated by the solar apparatus, and heat feed water or generate steam using lower-purity oilfield feed water. In some embodiments, a limited a mount of solar steam as a percentage of daytime oilfield steam is used; small solar collectors feeding energy into large steam distribution systems make little difference in total flow rate. In some embodiments and/or usage scenarios, one or more of the techniques described herein, such as solar steam injection and automatic control systems, enable higher fractions of solar steam use, in some situations, extending above 90% in both daytime and annual steam use. In some embodiments and/or usage scenarios, one or more of the techniques described herein enable line-focus solar collectors for oilfield steam generation that are relatively lower cost than some power tower solar apparatus based implementations.

Solar energy is collected and used for various oilfield applications. Collected solar energy is used to generate steam to feed an industrial process, such as downhole injection, enabling enhanced oil recovery. Solar energy is optionally indirectly collected using a heat transfer fluid in a solar collector. The heat transfer fluid delivers heat to a heat exchanger (such as a tube-in-tube heat exchanger) that in turn delivers heat into oilfield feed water, producing hotter water or steam. Solar energy is optionally directly collected by directly generating steam with solar collectors, and then injecting the steam downhole. Solar energy is optionally collected and used to preheat water that is then fed into fuel-fired steam generators that in turn produce steam for downhole injection. Solar energy is optionally collected and used to produce electricity via a Rankine cycle turbine generator, and rejected heat warms feed water for fuel-tired steam generators. Solar energy is optionally collected and used (directly or indirectly) to deliver heat to a heater-treater, with optional fuel-fired additional heat generation.

Injection of Solar Steam for Enhanced Oil Recovery Applications

In some embodiments, "steamflood" operations involve a pattern of multiple steam injection wells and multiple oil production wells, arranged so that injected steam causes increased production at the producer wells. While a "five-spot" pattern is common, many other arrangements of injection and production wells are contemplated using techniques taught herein. In some embodiments, "huff-and-puff" or "cyclic stimulation" steam injection operations involve periodically injecting steam into each well for a period of one or more days, then shutting steam supply to the well and producing oil from the well for a period of one or more weeks. In some embodiments, a steam distribution system of piping and flow control devices interconnects one or more steam generators to a plurality of steam injection wells that operate concurrently, in a steamflood configuration, a cyclic stimulation configuration, or some other suitable configuration. In some embodiments, applicable to "steamflood", "cyclic stimulation", and other suitable configurations of oilfield steaming, a plurality of concentrating solar thermal collectors gather solar energy for steam generation. Solar reflectors track the sun and direct solar radiation to thermal energy receivers, that directly or indirectly heat water and generate steam that is fed into the steam distribution system and injected downhole. In some embodiments, solar-generated steam provides the majority of total steam supply for the injection, and injection rate varies based on currently available sunshine. In some embodiments of "solar majority" steam injection, fuel-fired steam generators operate at night and during other periods of low solar radiation to provide enough steam to maintain temperature of the steam injection system and wells above ambient temperature, without contributing significant steam flow into the formation. In some embodiments of "solar majority" injection, fuel-fired steam generators operate continuously, providing a portion of daytime steam injection and continuing overnight and during periods of low solar radiation to maintain system temperature at lower flow rates.

FIG. 1 illustrates various details of an embodiment of an oilfield application of solar energy collection. In some embodiments, solar steam generators 38 are interconnected to steam distribution system 7 that also is supplied with steam from fuel-fired steam generators 9, and solar heat provides a portion of steam supply. In some embodiments, solar-generated steam provides a large portion of daytime steam. In some embodiments, an automatic control system (not illustrated) that automatically communicates with solar field controls and controls for fuel-fired steam generators, enables solar heat to provide a large portion of daytime steam.

Figure 2:
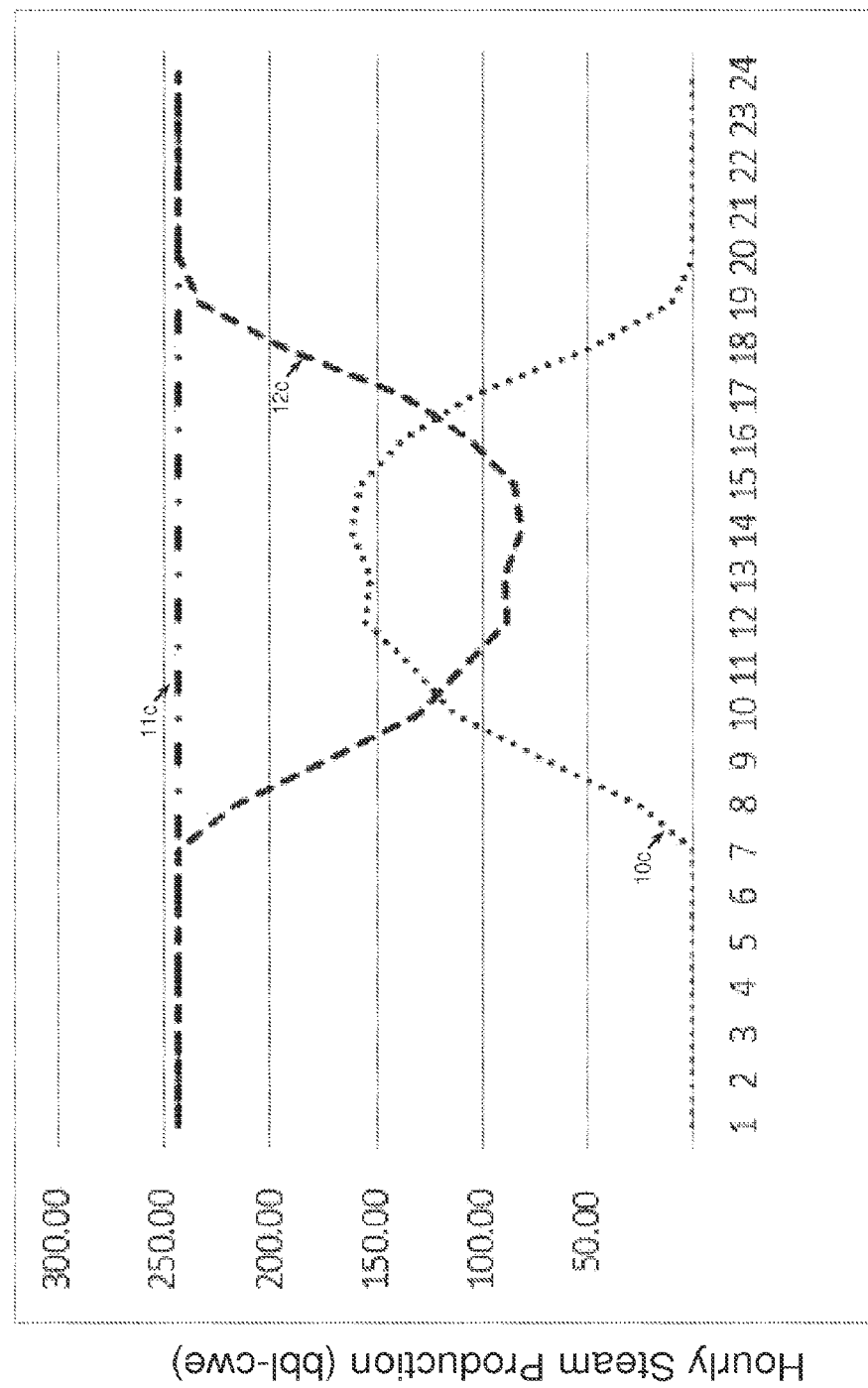
FIG. 2 illustrates various details of continuous constant-rate steam injection via hybrid gas-solar steaming.

FIG. 2 illustrates various details of a continuous constant-rate steam injection embodiment and/or mode of operation of the automatic control system. A "balancing" control unit (that is part of the automatic control system) communicates with solar field controls and issues commands to fuel-fired steam generator units, so that as solar steam output rate $10c$ rises, the firing rate in fuel-fired generators is adjusted downwards lowering fuel-generated steam rate $12c$ to maintain desired total steam injection rate $11c$. In some embodiments, the desired steam injection rate is nearly constant day and night, with flow rate varying approximately 10% about a target rate.

Figure 3:
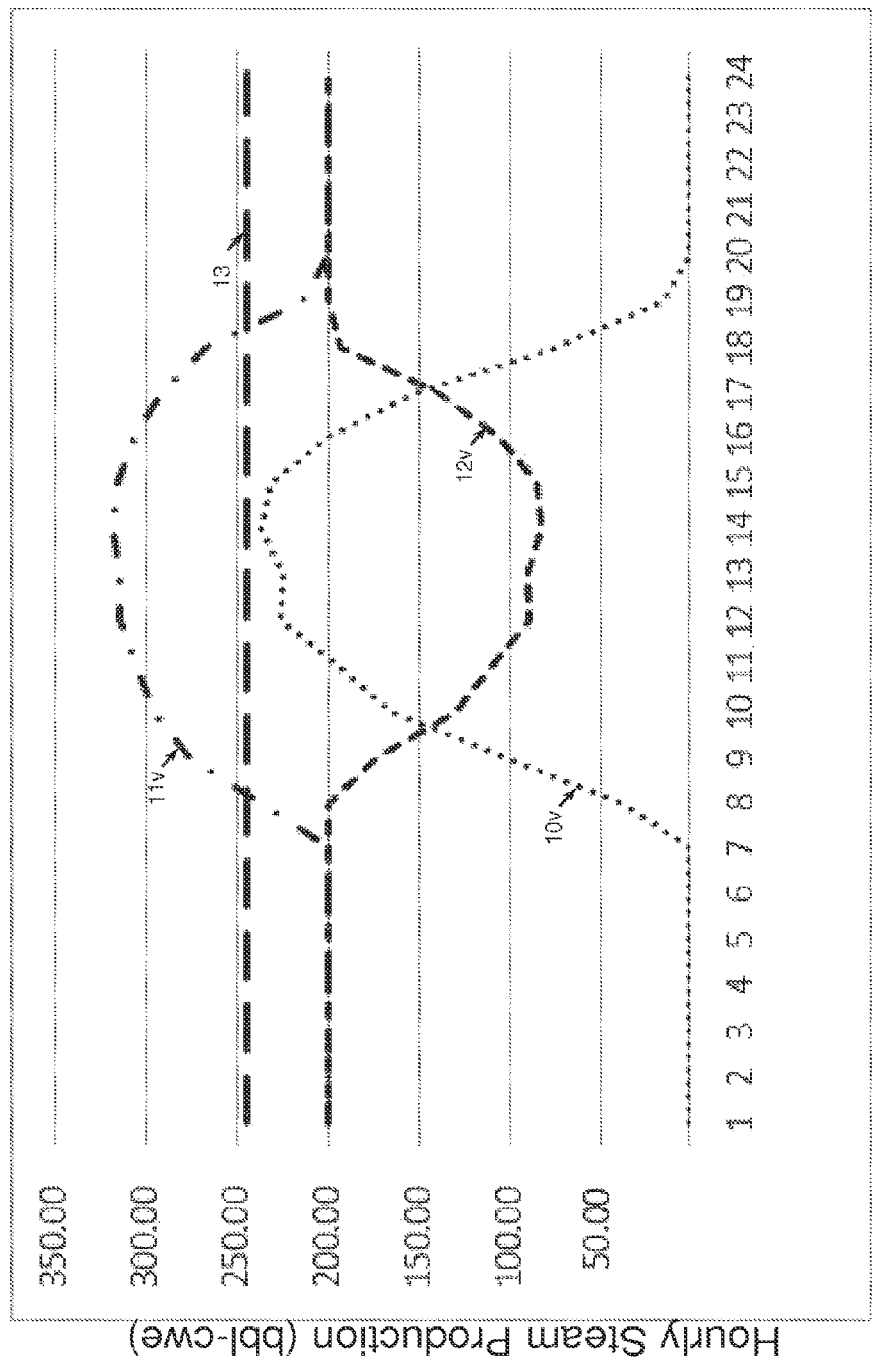
FIG. 3 illustrates various details of continuous variable-rate steam injection via hybrid gas-solar steaming.

FIG. 3, illustrates various details of a continuous variable-rate steam injection embodiment and/or mode of operation of the automatic control system that provides control of fuel-fired generators to enable overall steam injection rate $11v$ to vary as much as 50% from an "average" steam injection rate 13. Note in that as illustrated in FIG. 3, overall steam injection rate $11v$ is enabled to vary on an hourly basis depending on solar steam rate $10v$; in this mode of operation, solar energy is thus enabled to deliver a higher fraction of total daily steam production than in the constant-rate case illustrated in FIG. 2. In some usage scenarios, not illustrated, automated "turndown" of fuel firing rates and feed water rates in fuel-fired generators producing variable fuel-generated steam rates $12v$, enables solar steam rate $10v$ to deliver up to 100% of daytime steam flow while maintaining any desired total steam flow pattern.

In some embodiments, fuel-fired generator turndown strategy is designed to minimize annual cost of maintaining fuel burners and proving compliance with applicable standards for emissions of criteria pollutants. Solar radiation varies continuously, rising smoothly or discontinuously from dawn until noon. In some embodiments, an oilfield steam distribution system has multiple fuel-fired steam generators interconnected to a common steam distribution system. In some embodiments, to reduce or minimize a number of burner operating points to be measured and witnessed by regulatory authorities, a control system turns down burners by fixed amounts, to two or three fixed firing points; "full" and "minimum", or "full," "medium," and "minimum" firing rates. In an operating regime for a solar steam generation system with approximately constant steam flow, as solar radiation and solar-fired steam production changes, individual fuel-fired burners are automatically commanded to move from "full" to "minimum", or "full" to "medium" and then "medium" to "minimum". By independently automatically controlling multiple fuel-fired burners, the control system delivers approximately constant steam flow rates. In some embodiments, oilfield control systems alter an order that fuel-fired generators are commanded to turn down as solar radiation rises, or an order that fuel-fired generators are ordered to return to full output as solar radiation falls, to reduce or minimize operating costs. In some embodiments and/or usage scenarios, some steam generators are more efficient in fuel combustion than others and some steam generators experience higher maintenance costs associated with varying fuel firing rates. The control system's ordering of generator firing commands is implemented taking into account the characteristics of particular steam generators.

Indirect Steam Generation for Enhanced Oil Recovery Applications

In some embodiments of solar steam generation for enhanced oil recovery, solar heat is collected using a heat transfer fluid that gathers heat in solar collectors and delivers heat to a heat exchanger. The heat exchanger delivers heat into oilfield feed water, producing hotter water or steam that in turn is fed into an oilfield feed water or steam distribution system. In some embodiments of indirect steam generation, the heat transfer fluid is a synthetic oil, such as Therminol or Dowtherm. In some embodiments of indirect steam generation, the heat transfer fluid is a blend of inorganic salts that circulate as molten salt. In some embodiments of indirect steam generation, the heat transfer fluid is high-purity pressurized water that circulates and boils in a solar field and condenses in the heat exchanger.

Tube-In-Tube Heat Exchanger for Indirect Solar Steam Generation for Enhanced Oil Recovery Applications In some embodiments of indirect solar steam generation, a heat exchanger is designed as a "tube-in-tube" type exchanger, where an interior tube carries high-pressure oilfield feed water that is being converted to steam, and an outer tube carries a heat transfer fluid heated by solar collectors. Because liquid water is evaporated as it proceeds through steam generator piping, residual contaminants carried in feed water concentrate as liquid volume drops, progressively rising as liquid converts to vapor phase. The term "steam quality" refers to the percentage of inlet water mass that has been converted to vapor phase; thus 70% steam quality would have only 30% of original water in liquid phase, and contaminants would be concentrated by more than threefold from the original feed water.

In some embodiments, an ideal oilfield steam generator delivers the highest possible steam quality for a given feed water quality. Higher steam quality delivers more energy per pound of water injected. However, if steam quality exceeds limits imposed by water contaminant concentration, corrosion and scaling begin to occur at unacceptably high rates, causing fouling, plugging, and potential failure or burnout of steam generator tubing. In some embodiments, economical operation occurs when steam quality is tightly controlled, such as within a 5% to 10% range. In some embodiments and/or usage scenarios, a serpentine horizontal arrangement of tube-in-tube apparatus enables economical operation, due in part to an extended horizontal boiling zone that limits mineral deposits, and in part to a capability to periodically clean collection tube interiors with acids and mechanical scrubbers known as "pigs".

In some embodiments, fuel-fired steam generators maintain steam quality within a desired range by measuring inlet air and water temperatures, and controlling fuel firing rate and water feed rate appropriately. In some embodiments, a tube-in-tube heat exchanger for indirect solar steam generation measures incoming heat transfer fluid temperature and flow rate. Automatic controls adjust inlet valves and pumps as well as outlet valves to manage outlet steam quality by modulating feed water flow in a manner proportional to heat carried in a heat transfer fluid. Automatic controls shut a steam outlet valve when heat flow from a solar field is inadequate to make target steam quality. A control system for the tube-in-tube heat exchanger communicates with a master control and/or directly with controls for other fuel-fired steam generators (such as described above) to maintain overall desired steam flow rates.

Direct Steam Generation for Enhanced Oil Recovery Applications

In some embodiments of solar steam generation for enhanced oil recovery, oilfield feed water is fed directly into solar collectors, in an arrangement similar to a feed water system for fuel-fired steam generators, and as solar heat is collected, the collected solar heat directly generates steam that in turn is fed into an oilfield feed water or steam distribution system. In some embodiments and/or usage scenarios, line-focus solar collectors enable economical operation in oilfield steam generators, due in part to an extended horizontal boiling zone that limits mineral deposits, and in part to a capability to periodically clean collection tube interiors with acids and mechanical scrubbers known as "pigs".

Solar Water Preheating for Enhanced Oil Recovery Applications

In some embodiments of solar steam generation for enhanced oil recovery, oilfield feed water is fed directly into solar collectors, and is raised in temperature by solar heat without boiling (without conversion from liquid to vapor phase). The heated water is then fed from solar collectors into one or more fuel-fired steam generators. In some embodiments, a contribution of solar heat increases a rate of steam production by a fuel-fired steam generator for constant fuel firing rate. In some embodiments, a contribution of solar heat reduces a fuel firing rate for a fuel-fired steam generator while maintaining a constant steam production rate.

Solar Cogeneration of Heat and Electric Power for Enhanced Oil Recovery Applications In some embodiments of solar water preheating for enhanced oil recovery, oilfield water is directly heated via circulation in solar collectors. In some embodiments, oilfield water is preheated via a heat exchanger in a "solar cogeneration" configuration. In some cogeneration embodiments, solar collectors gather solar heat that drives a Rankine cycle turbine generator. Rejected heat from the Rankine generator warms feed water through a heat exchanger, feeding the warmed feed water to one or more fuel-fired steam generators. In some embodiments, a heat transfer fluid flows through a solar field, and generates high-purity high-pressure vapor in a heat exchanger. In some embodiments, a solar field directly generates high-purity, high-pressure vapor to drive a turbine. The high pressure vapor runs a Rankine cycle turbine. Turbine exhaust is condensed in a heat exchanger, giving up latent heat of vaporization to oilfield feed water flowing through the heat exchanger. In some embodiments, vapor/liquid in a Rankine cycle turbine is steam/water. In some embodiments, vapor/liquid in the Rankine cycle turbine is an organic fluid such as toluene or pentane. In some embodiments, heat transfer fluid flowing through a solar field is a synthetic oil such as Therminol or Dowtherm. In some embodiments, heat transfer fluid flowing through a solar field is a molten salt mixture. In some embodiments and/or usage scenarios, a configuration where a solar field directly generates high-pressure high-purity steam that flows through a steam turbine, producing electric power, and is condensed in a heat exchanger that heats oilfield steam generator feed water, is implemented with a reduced or lowest cost compared to other implementations.

Solar Heating for Produced Oil Treatment

Figure 4:
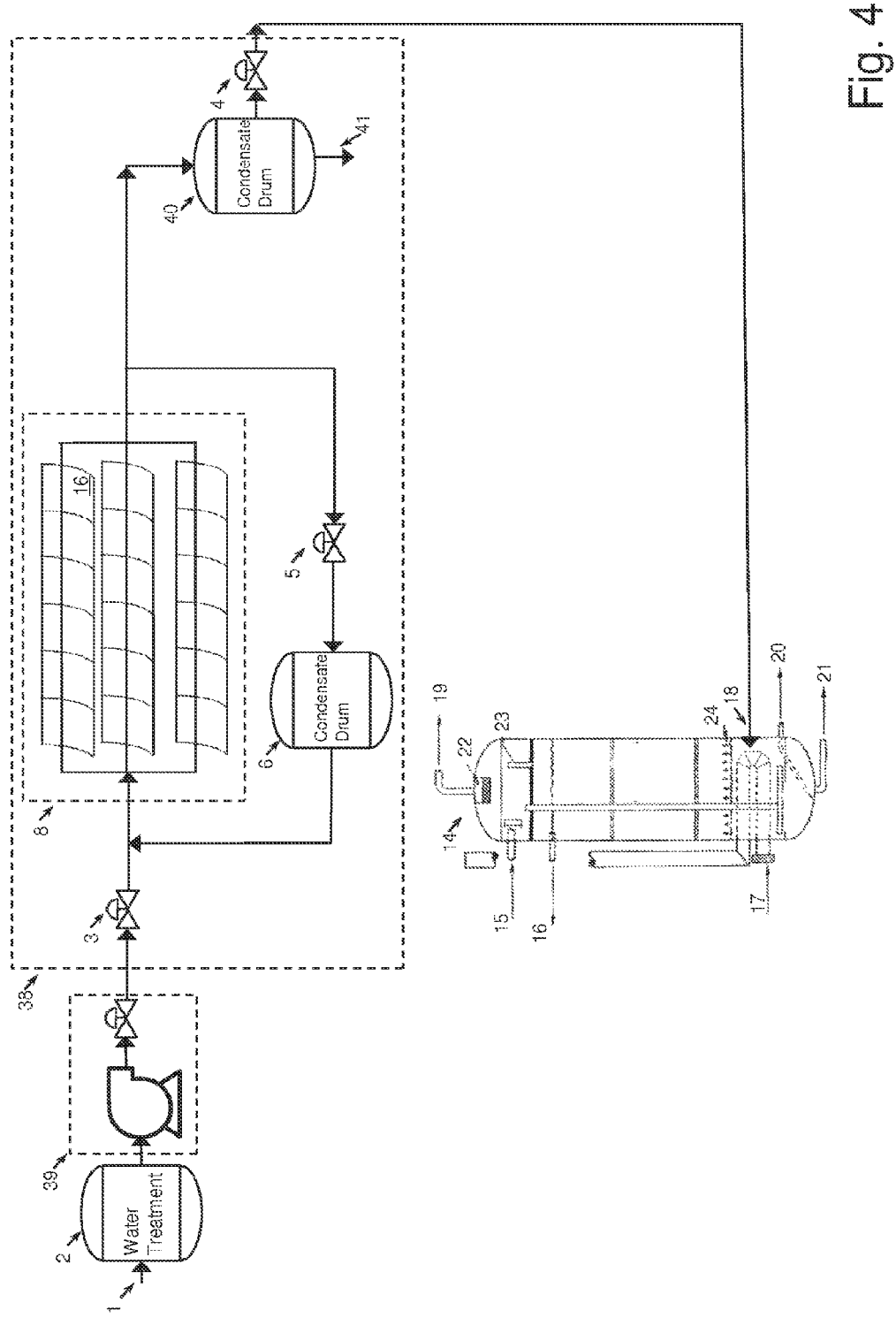
FIG. 4 illustrates various details of an embodiment of a solar heated heater-treater.

In some embodiments, product flowing from oil wells is a mixture of petroleum, water, gas, and various contaminants. Separating oil and water economically is desirable, in some usage scenarios. In some embodiments, such as illustrated in FIG. 4, "heater-treater" units 14 separate oil 16, water 20, and gas 19, using a combination of chemicals and heat to break oil-water emulsions. The heater-treater units, in some embodiments, comprise one or more of drain 21, mist extractor 22, gas equalizer 23, and during operation in some scenarios contain oil/water interface 24. In some embodiments, firetube heaters 17 are used in heater-treaters, delivering heat from fuel combustion into an oil-water-gas mixture. In some embodiments, a plurality of concentrating solar thermal collectors (e.g. solar steam generators 38) gather solar energy as heat. Solar reflectors 16 track the sun and direct solar radiation to thermal energy receivers that directly or indirectly provide heat to one or more heater-treater units. In some embodiments, heat transfer fluid circulates, gathering heat in a solar field, and delivers the gathered heat into a heater-treater via heal exchanger tube element 18. In some embodiments, the heat transfer fluid is a synthetic oil such as Therminol or Dowtherm. In some embodiments, the heat transfer fluid is a molten salt mixture. In some embodiments, pressurized water is circulated in a solar field, delivering heat as steam that is recondensed in a heat exchanger tube in a heater-treater. In some embodiments, solar oil heat-treatment optionally operates intermittently, using solar radiation as available. In some embodiments, a heater-treater unit optionally includes a fuel burner (such as firetube heaters 17) as well as a solar heat exchanger, enabling the heater-treater unit to operate continuously, with solar energy providing a portion of annual energy. In some embodiments (not illustrated), a thermal energy storage system collects solar heat during the day and provides extended-hour or continuous heat delivery to a heater-treater unit, enabling continuous operation without fuel combustion.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible, consistent with the description, and are within the scope of the claims of the issued patent. The names given to elements are merely exemplary, and should not be construed as limiting the concepts described. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, operations, functions, or portions thereof.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other applications, and are not limited to the particular application or industry of the described embodiments. The invention is thus to be construed as including all possible modifications and variations encompassed within the scope of the claims of the issued patent.

What is claimed is:

1. An oil recovery system, comprising:
   a solar steam generator, comprising:
      a reflector positioned to receive and redirect solar radiation; and
      a receiver positioned to receive radiation redirected by the reflector;
   a fuel-fired steam generator coupled in parallel with the solar steam generator;
   a steam distribution system operatively coupled to both the solar steam generator and the fuel-fired steam generator to receive steam from both the solar steam generator and the fuel-fired steam generator, the steam distribution system being coupled to at least one oilfield steam injection well; and
   an automatic control system coupled to at least one of the solar steam generator or the fuel-fired steam generator and programmed with instructions that, when executed, direct an incoming volume of water to be heated by only the solar steam generator or only the fuel-fired steam generator.

2. The oil recovery system of claim 1 wherein the receiver carries steam directed to the steam distribution system.

3. The oil recovery system of claim 1 wherein the receiver carries a working fluid, and wherein the solar steam generator further comprises a heat exchanger coupled between the receiver and the steam distribution system to transfer heat from the working fluid in the receiver to steam in the steam distribution system.

4. The oil recovery system of claim 1 wherein the automatic control system is programmed with instructions that, when executed, decrease steam output by the fuel-fired steam generator in response to an increase in steam output by the solar steam generator.

5. The oil recovery system of claim 1 wherein the automatic control system is programmed with instructions that, when executed, control a combined steam output of the solar steam generator and the fuel-fired steam generator to be approximately constant over the course of a day.

6. The oil recovery system of claim 1 wherein the automatic control system is programmed with instructions that, when executed, direct a greater amount of steam to the at least one oilfield steam injection well during the day than at night.

7. An oil recovery system, comprising:
an automatic control system coupleable to at least one of a solar steam generator or a fuel-fired steam generator which in turn coupled to a steam distribution system that (a) receives steam from both the solar steam generator and the fuel-fired steam generator, and (b) is coupled to at least one oilfield steam injection well, the automatic control system being programmed with instructions that, when executed:
receive an input;
in response to the input, direct an incoming volume of water to be heated to steam by only the solar steam generator or only the fuel-fired steam generator; and
direct the steam to the oilfield injection well via the steam distribution system.

8. The system of claim 7, further comprising the solar steam generator, and wherein the solar steam generator includes:
a reflector positioned to receive and redirect solar radiation; and
a receiver positioned to receive radiation redirected by the reflector.

9. The system of claim 8, further comprising the fuel-fired steam generator, and wherein the fuel-fired steam generator is coupled in parallel with the solar steam generator.

10. The system of claim 7 wherein the input corresponds to a measure of at least one of steam quality, steam flow rate or steam temperature.

11. An oil recovery system, comprising:
a solar steam generator, comprising:
a reflector positioned to receive and redirect solar radiation; and
a receiver positioned to receive radiation redirected by the reflector;
at least one fuel-fired steam generator coupled to the solar steam generator, the at least one fuel-fired steam generator including at least one burner;
a steam distribution system operatively coupled to both the solar steam generator and the at least one fuel-fired steam generator to receive steam from both the solar steam generator and the fuel-fired steam generator, the steam distribution system being coupled to at least one oilfield steam injection well; and
an automatic control system coupled to the at least one fuel-fired steam generator and programmed with instructions that, when executed:
reduce a steam output of the at least one fuel-fired steam generator by changing the output setting of the at least one burner from a first fixed output setting to a second fixed output setting, the first fixed output setting corresponding to a first heat output level and the second fixed output setting corresponding to a second heat output level less than the first; and
direct an incoming volume of water to be heated by only the solar steam generator or only the fuel-fired steam generator.

12. The system of claim 11 wherein the at least one burner includes multiple burners.

13. The system of claim 11 wherein the at least one burner includes multiple burners, and wherein a combined steam flow rate from the solar steam generator and the fuel-fired generator at the first fixed output setting is approximately the same as at the second fixed output setting.

14. The system of claim 11 wherein the automatic control system is programmed with instructions that, when executed, reduce a steam output of the fuel-fired steam generator in response to an increased steam output from the solar steam generator.

15. The system of claim 11 wherein the automatic control system is programmed with instructions that, when executed, reduce a steam output of the fuel-fired steam generator in response to an increase in solar radiation at the reflector.

16. The system of claim 11 wherein the automatic control system is programmed with instructions that, when executed, increase a steam output of the fuel-fired steam generator in response to a decreased steam output from the solar steam generator.

17. The system of claim 11 wherein the solar steam generator and the fuel-fired steam generator are coupled in parallel.

18. The system of claim 11 wherein the receiver carries steam.

19. The system of claim 11 wherein the receiver carries a heat transfer fluid, and wherein the system further comprises a heat exchanger coupled to the receiver to transfer heat from the receiver to an oilfield feedwater conduit.

20. An oil recovery system, comprising:
a solar steam generator, comprising:
a reflector positioned to receive and redirect solar radiation; and
a receiver positioned to receive radiation redirected by the reflector;
at least one fuel-fired steam generator coupled to the solar steam generator, the at least one fuel-fired steam generator including at least one burner; and
a steam distribution system operatively coupled to both the solar steam generator and the at least one fuel-fired steam generator to receive steam from both the solar steam generator and the fuel-fired steam generator, the steam distribution system being coupled to at least one oilfield steam injection well; and
an automatic control system coupled to the at least one fuel-fired steam generator and programmed with instructions that, when executed:
reduce a steam output of the fuel-fired steam generator by changing the output setting of at least one of the burners from a first fixed output setting to at least one of a second fixed output setting and a third fixed output setting, the first fixed output setting corresponding to a first heat output level, the second fixed output setting corresponding to a second heat output level less than the first, and the third fixed output setting corresponding to a third heat output level less than the second; and
direct an incoming volume of water to be heated by only the solar steam generator or only the fuel-fired steam generator.

21. The system of claim 20 wherein the at least one burner includes multiple burners.

22. The system of claim 20 wherein the at least one burner includes multiple burners, and wherein a combined steam flow rate from the solar steam generator and the fuel-fired generator at the first fixed output setting is approximately the same as at the second fixed output setting.

23. A method for controlling an oil recovery automatic control system, comprising:

programming the automatic control system with instructions that, when executed:
  receive an input;
  in response to the input, direct an incoming volume of water to be heated to steam by only a solar steam generator or only a fuel-fired steam generator; and
  direct the steam to an oilfield injection well via a steam distribution system, wherein the automatic control system is coupleable to at least one of the solar steam generator or the fuel-fired steam generator, which are in turn operatively coupled to the steam distribution system, and wherein the steam distribution system (a) receives steam from both the solar steam generator and the fuel-fired steam generator, and (b) is coupled to the oilfield steam injection well.

24. The method of claim 23 wherein the input corresponds to a measure of at least one of steam quality, steam flow rate or steam temperature.

25. The method of claim 23, further comprising coupling the automatic control system to the solar steam generator and the fuel-fired steam generator.

\* \* \* \* \*